United States Patent
Sharma et al.

(10) Patent No.: US 7,389,412 B2
(45) Date of Patent: Jun. 17, 2008

(54) SYSTEM AND METHOD FOR SECURE NETWORK ROAMING

(75) Inventors: Mukesh Sharma, Oak Hill, VA (US); Christopher Skiscim, Dickerson, MD (US); Philip Roberts, Palatine, IL (US); Luis Sanchez, Mayaguez, PR (US)

(73) Assignee: Interactive Technology Limited of HK, Hong Kong (CN)

( * ) Notice: Subject to any disclaimer, the term of this patent is extended or adjusted under 35 U.S.C. 154(b) by 1103 days.

(21) Appl. No.: 10/224,226

(22) Filed: Aug. 5, 2002

(65) Prior Publication Data

US 2003/0039234 A1 Feb. 27, 2003

Related U.S. Application Data

(63) Continuation-in-part of application No. 09/928,290, filed on Aug. 10, 2001.

(51) Int. Cl.
*H04L 9/00* (2006.01)

(52) U.S. Cl. .................. 713/153; 713/169; 713/171; 380/270

(58) Field of Classification Search ............... 713/153, 713/169, 171; 380/270
See application file for complete search history.

(56) References Cited

U.S. PATENT DOCUMENTS

| | | | | |
|---|---|---|---|---|
| 5,875,394 | A * | 2/1999 | Daly et al. | 455/411 |
| 6,104,928 | A * | 8/2000 | Waugh | 455/445 |
| 6,128,389 | A * | 10/2000 | Chan et al. | 380/247 |
| RE36,946 | E * | 11/2000 | Diffie et al. | 380/278 |
| 6,225,888 | B1 * | 5/2001 | Juopperi | 340/5.8 |
| 6,408,175 | B1 * | 6/2002 | Park | 455/411 |
| 6,496,704 | B2 * | 12/2002 | Yuan | 455/466 |
| 6,711,147 | B1 * | 3/2004 | Barnes et al. | 370/338 |
| 6,769,000 | B1 * | 7/2004 | Akhtar et al. | 707/103 R |
| 6,839,553 | B2 * | 1/2005 | Park | 455/411 |
| 6,931,529 | B2 * | 8/2005 | Kunzinger | 713/153 |
| 6,937,731 | B2 * | 8/2005 | Chiu | 380/270 |
| 6,986,061 | B1 * | 1/2006 | Kunzinger | 709/225 |
| 7,028,186 | B1 * | 4/2006 | Stenman et al. | 713/173 |
| 7,058,180 | B2 * | 6/2006 | Ferchichi et al. | 380/247 |

(Continued)

OTHER PUBLICATIONS

Eardley et al., Modular IP Architectures For Wireless Mobile Access, Brain Workshop, Nov. 20, 2000.*

(Continued)

*Primary Examiner*—Nasser Moazzami
*Assistant Examiner*—David García Cervetti
(74) *Attorney, Agent, or Firm*—Schwabe, Williamson & Wyatt, P.C.

(57) ABSTRACT

A wireless data network process and system are provided based on a network with prior network-based authentication of a connected mobile node (MN) and with a network connection to a packet gateway node (PGN). The method and system establish and use an authentication mechanism between the MN and the PGN using the network connection. An encrypted channel is then set up between the MN and the PGN based on authentication established with the authentication mechanism. Configuration data is sent from the PGN to the MN using the encrypted channel. The configuration data may then be used by the MN for communication to and from the MN with the PGN via an access point. Any network connected to the PGN via any access point may then be used.

32 Claims, 10 Drawing Sheets

U.S. PATENT DOCUMENTS

| | | | |
|---|---|---|---|
| 7,065,067 B2* | 6/2006 | Song et al. | 370/338 |
| 7,079,499 B1* | 7/2006 | Akhtar et al. | 370/310 |
| 7,107,620 B2* | 9/2006 | Haverinen et al. | 726/29 |
| 7,120,422 B2* | 10/2006 | Antti | 455/411 |
| 7,123,721 B2* | 10/2006 | Panjwani et al. | 380/270 |
| 7,136,645 B2* | 11/2006 | Hanson et al. | 455/435.1 |
| 7,152,160 B2* | 12/2006 | Lantto et al. | 713/168 |
| 7,171,460 B2* | 1/2007 | Kalavade et al. | 709/223 |
| 2001/0055394 A1* | 12/2001 | Vanttinen et al. | 380/258 |
| 2002/0012433 A1* | 1/2002 | Haverinen et al. | 380/247 |
| 2002/0018569 A1* | 2/2002 | Panjwani et al. | 380/247 |
| 2002/0066036 A1* | 5/2002 | Makineni et al. | 713/201 |
| 2002/0075812 A1* | 6/2002 | Corwin | 370/254 |
| 2002/0077078 A1* | 6/2002 | Antti | 455/410 |
| 2002/0101859 A1* | 8/2002 | Maclean | 370/352 |
| 2002/0102964 A1* | 8/2002 | Park | 455/411 |
| 2002/0147820 A1* | 10/2002 | Yokote | 709/229 |
| 2002/0157024 A1* | 10/2002 | Yokote | 713/201 |
| 2002/0161723 A1* | 10/2002 | Asokan et al. | 705/67 |
| 2002/0164026 A1* | 11/2002 | Huima | 380/247 |
| 2002/0178358 A1* | 11/2002 | Perkins et al. | 713/169 |
| 2002/0191548 A1* | 12/2002 | Ylonen et al. | 370/254 |
| 2002/0191572 A1* | 12/2002 | Weinstein et al. | 370/338 |
| 2002/0197979 A1* | 12/2002 | Vanderveen | 455/410 |
| 2003/0012382 A1* | 1/2003 | Ferchichi et al. | 380/270 |
| 2003/0031151 A1 | 2/2003 | Sharma et al. | |
| 2003/0051041 A1* | 3/2003 | Kalavade et al. | 709/229 |
| 2003/0051140 A1* | 3/2003 | Buddhikot et al. | 713/169 |
| 2003/0091013 A1* | 5/2003 | Song et al. | 370/338 |
| 2003/0147532 A1* | 8/2003 | Hakkarainen et al. | 380/239 |
| 2003/0147537 A1* | 8/2003 | Jing et al. | 380/277 |
| 2003/0157926 A1* | 8/2003 | Ala-Laurila et al. | 455/406 |
| 2004/0015692 A1* | 1/2004 | Green et al. | 713/169 |
| 2004/0054794 A1* | 3/2004 | Lantto et al. | 709/229 |
| 2004/0090972 A1* | 5/2004 | Barrett et al. | 370/401 |
| 2004/0151322 A1* | 8/2004 | Sovio et al. | 380/278 |
| 2006/0168210 A1* | 7/2006 | Ahonen et al. | 709/225 |

OTHER PUBLICATIONS

Rysavy et al., AT&T Wireless IP Network Security, Oct. 1999, AT&T Wireless Services.*

* cited by examiner

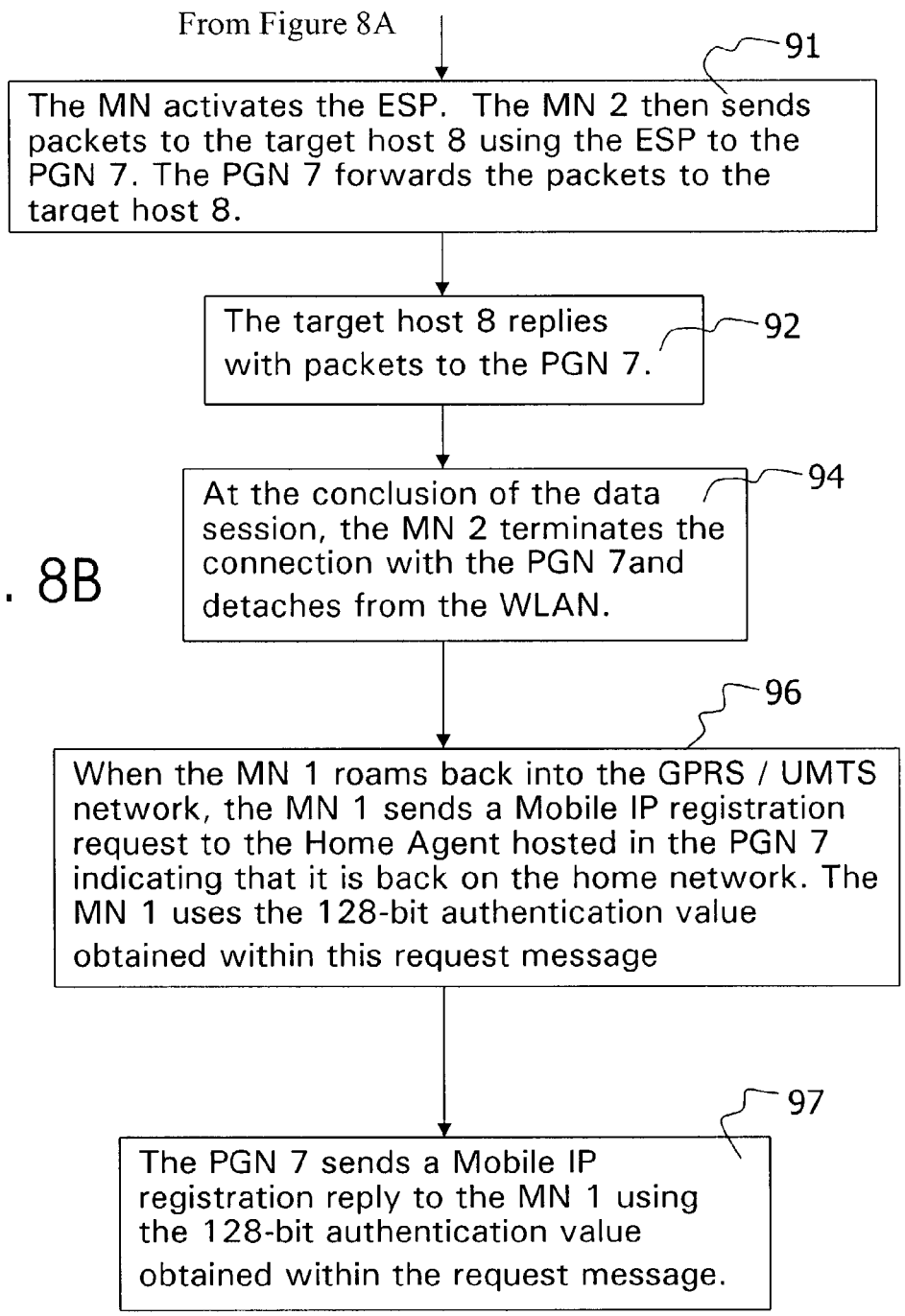

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
~      Type     !    Seq. No    !   Fname Len   !     Fname
+-+-+-+-+-+-+-+-+-+-+-+-+-+-+-+-+-+-+-+-+-+-+-+-+-+-+-+-+-+-+-+-+
                                ~

+-+-+-+-+-+-+-+-+-+-+-+-+-+-+-+-+-+-+-+-+-+-+-+-+-+-+-+-+-+-+-+-+
~ Key File Len  |        Contents of the public key file
+-+-+-+-+-+-+-+-+-+-+-+-+-+-+-+-+-+-+-+-+-+-+-+-+-+-+-+-+-+-+-+-+
         MN Datagram Format For Public Key Exchange
```

Fig. 9A

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
~      Type     !    Seq. No    !   Fname Len   !     Fname
+-+-+-+-+-+-+-+-+-+-+-+-+-+-+-+-+-+-+-+-+-+-+-+-+-+-+-+-+-+-+-+-+
                                ~

+-+-+-+-+-+-+-+-+-+-+-+-+-+-+-+-+-+-+-+-+-+-+-+-+-+-+-+-+-+-+-+-+
~ Key File Len  |        Contents of the public key file
+-+-+-+-+-+-+-+-+-+-+-+-+-+-+-+-+-+-+-+-+-+-+-+-+-+-+-+-+-+-+-+-+
         PGN Datagram Format For Public Key Exchange
```

Fig. 9B

SYSTEM AND METHOD FOR SECURE NETWORK ROAMING

This is a Continuation In Part of application Ser. No. 09/928,290 filed Aug. 10, 2001, and the entire disclosure of this prior application is considered to be part of the disclosure of the accompanying application and is hereby incorporated by reference therein.

FIELD OF THE INVENTION

The invention relates generally to network systems and more particularly to communications between network peers across wireless local area networks (WLANS) as well as across a radio access network (RAN).

BACKGROUND OF THE INVENTION

The growth in laptop computers and handheld computing devices (e.g., PDAs (Personal Digital Assistant) has increased the need for users to seek network connectivity in many different locales. Wireless networks have thus gained popularity because of their convenience. However, security in a wireless networking environment is a serious concern. Because network traffic is broadcast over radio frequencies it becomes very easy for anyone with a proper radio receiver to intercept this traffic for the purpose of gaining vital information or for masquerading as a legitimate user. Protecting these communications is a strong requirement in mobile computing.

For wireless LAN (Local Area Network) communications, the 802.11 standard specifies the Wired Equivalent Privacy (WEP) in order to address the security issues, primarily protecting data confidentiality, inherent in this technology. The WEP protocol is an international standard and widely deployed. Unfortunately, it has been shown that WEP fails to achieve its data confidentiality goals leaving users vulnerable to a number of different attacks.

These vulnerabilities are well known and documented in, for example, J. R. Walker, "Unsafe at any key size: An analysis of the WEP encapsulations, IEEE document 802.11-00/362, 2001." and references therein.

These security problems are a significant issue with regard to the use of the WEP. Further, combining the third generation wireless data access protocol General Packet Radio Service (GPRS)/Universal Mobile Telecommunications System (UMTS) to allow secure roaming between these networks is advantageous. Indeed, roaming between GPRS/UMTS networks across networks deemed insecure is a significant problem requiring a solution.

SUMMARY AND OBJECTS OF THE INVENTION

It is an object of the invention to provide a process and system that allows a mobile user to securely communicate with a data source such as a web server using networks which do not have sufficient security features, wherein the security is provided with minimal complications as to establishing the secure channel of communications.

According to the invention, a wireless data network process and system are provided based on a network with prior network-based authentication of a connected mobile node (MN) and with a network connection to a packet gateway node (PGN). This network with prior authentication can be for example a General Packet Radio Service (GPRS) network (also known as 3 G) or other similar network where the MN has strong authentication already established (e.g., an account with a wireless service provider). The method and system establish and use an authentication mechanism between the MN and the PGN using the network connection. An encrypted channel is then set up between the MN and the PGN based on authentication established with the authentication mechanism. Configuration data is sent from the PGN to the MN using the encrypted channel. The configuration data may then be used by the MN for secure communication to and from the MN via the PGN. Any network connected to the PGN may then be used.

The authentication mechanism advantageously includes generating a public/private key pair and storing the pair with names and sending from the MN a message containing its public key and key name to the PGN via the authenticated network connection. The PGN then sends a message containing the PGN's public key and public key name to the MN. The MN receives the PGN's public key and stores this PGN public key at the client. The PGN and MN use their public keys for mutual authentication when negotiating an encrypted channel.

Mobile IP and IPsec configuration data are sent from the PGN to the MN using an encrypted channel based on the exchanged public keys and advantageously includes providing Mobile Internet Protocol (MIP or Mobile IP) configuration data and the IP Security protocol (IPsec) configuration data. The Internet Key Exchange (IKE) protocol may be used with the MN requesting the Encapsulated Security Protocol for establishing a security association (SA) with the PGN. The MN may then connect to a non-GPRS wireless local network and establish a MIP session across the non-GPRS network as a tunneled session using a IPsec encapsulating security payload (ESP). A new Mobile IP session key may be obtained as needed by sending a Mobile IP registration request with a Vendor Specific Extension indicating that a new Mobile IP session key is desired, receiving, validating and authenticating this message at the PGN and generating a new Mobile IP session key and encrypting it with the MN's public key. The MN the extracts the encrypted value and decrypts the encrypted value with the private key of the MN. The registration reply may be with an authentication value based on the previous Mobile IP session key.

This invention solves the inherent security flaws of establishing network connections using WEP by making use of the Mobile IP standard [C. Perkins, IP Mobility Support, RFC 3220, Internet Engineering Task Force, January 2002] in conjunction with the IP Security (IPsec) protocol suite within the GPRS/UMTS infrastructure. The invention allows for seamless and secure roaming among wireless LANs and GPRS/UMTS networks. Indeed, the invention allows for secure roaming where the local access network is deemed insecure. The invention makes use of a network infrastructure node, the packet gateway node (PGN) that is capable of function as a Gateway GPRS Serving Node network element as well as a Mobile IP Home Agent.

A mobile node or MN can be connected to the Internet by using wire or wireless network interfaces. However due to roaming, the device may change its network attachment each time it moves to a new link. It is therefore required that efficient protocols will be able to inform the network about this change in network attachment such that the internet data packets will be delivered in a seamless way (without any disruption of communication connection) to the new point of attachment. Such a problem is solved by use of the Mobile IP protocol (Mobile IP)—as specified by the Mobile IP IETF working group. Mobile IP is a scalable mechanism designed to accommodate device mobility within the Internet. It enables a mobile device to change its point of attachment to an IP-based network (e.g. the Internet). (with the help of Foreign Agents and a Home agent) while keeping an unchanging IP address called its Home IP address. Mobile IP does not require changes in the existing routing infrastructure and works well for mobility across homogeneous media and heterogeneous media.

The basic idea behind the Mobile IP protocol is for a mobile device or mobile node to always keep a Home IP address, irrespective of its current attachment to the Internet. Packets addressed to the MN will always go via the home network intercepted by the home agent and then are forwarded on from there as necessary. When the mobile device is on its home network, it acts just like any other stationary device. When it is away from home, visiting a foreign network, the device registers its temporary location (care-of address or COA) with the home agent situated on mobile's home network, which acts as an anchor point for the MN. Mobile IP can use two types of care of address: a foreign agent care-of address (an address from/of the foreign agent located in the visited network), and a co-located care-of address (an externally obtained care of address either through the Dynamic Host Configuration Protocol (DHCP) or any other means). Depending on the care-of address type, the MN registers itself i.e., its location with the home network i.e. home agent either directly or through a foreign agent's help.

After a successful registration, the HA will intercept packets destined to the MN device in its home network, and forward them to the MN's current point of attachment. The forwarding is done by "tunneling" the packets to the MN care-of address by encapsulating the original IP packet in another IP packet destined to the MN's care-of address. At the end of the tunnel, either at the foreign agent or at the MN itself, the packets are de-encapsulated thus providing the original IP packet for delivery to the MN. Packets originating from the MN are sent in the same way as from any other stationary host (except in the case of a reverse tunnel). To provide confidentiality between the MN and the Home Agent, the IPsec protocol is used.

The Internet Security Protocol (IPSec) is a suite of protocols designed to provide security services for the Internet Protocol (IP). Within the IPSec protocol, extensive use is made of mathematical algorithms for strong authentication and strong encryption. These algorithms are computationally intensive and constitute a significant processing overhead on data exchange. Consequently, specialized hardware is often used to accelerate the computations. The full set of authentication and encryption algorithms, as well as protocols supported by IPSec are well specified and can be found, for instance, in "The Big Book of IPSec RFCs", Morgan Kaufmann, 2000.

The IPSec protocol suite provides an architecture with three overall pieces. An authentication header for IP lets communicating parties verify that data was not modified in transit and, depending on the type of key exchange, that it genuinely came from the apparent source. An encapsulating security payload (ESP) format for IP is used that encrypts data to secure it against eavesdropping during transit. A protocol negotiation and key exchange protocol, the Internet Key Exchange (IKE) is used that allows communicating parties to negotiate methods of secure communication. IKE implements specific messages from the Internet Security Association and Key Management (ISAKMP) message set. A security association (SA) is established between peers using IKE. The SA groups together all the things a processing entity at the peer needs to know about the communication with the other entity. This is logically implemented in the form of a Security Association Database. The SA, under the IPSec specifies:

- the mode of the authentication algorithm used in the authentication header and the keys to that authentication algorithm;
- the ESP encryption algorithm mode and the keys to that encryption algorithm;
- the presence and size of (or absence of) any cryptographic synchronization to be used in that encryption algorithm;
- how you authenticate communications (using what protocol, what encrypting algorithm and what key);
- how you make communications private (again, what algorithm and what key);
- how often those keys are to be changed;
- the authentication algorithm, mode and transform for use in ESP plus the keys to be used by that algorithm;
- the key lifetimes;
- the lifetime of the SA itself,
- the SA source address; and
- a sensitivity level descriptor.

The SA provides a security channel to a network peer wherein the peer can be an individual unit, a group another network or network resource. Various different classes of these security channels may be established with SAs. Using IPSec network entities can build secure virtual private networks. Using the ESP a secure virtual private network service called secure tunneling may be provided wherein the original IP packet header is encapsulated within the ESP. A new IP header is added containing the routable address of a security gateway allowing the private, non-routable IP addresses to be passed through a public network (the Internet), that otherwise wouldn't accept them. With tunneling the original source and destination addresses maybe hidden from users on the public network. The IPSec protocol is operated between two entities in an IP-based network. In order for the entities to securely exchange data, they must 1. Agree on the type of protection to be used. The protection can be data origin authentication, data integrity or data confidentiality, or some combination.

2. For the chosen type of protection, agree on the algorithm(s) each entity will use as well as other parameters. The two entities authenticate one another and establish an ISAKMP Security Association and encryption/decryption key for exchange of shared, secret keys to be used for data exchange. The ISAMKP SA is used for securely passing messages that control the IPSec protocol.

3. For the chosen type of protection, the two entities agree on keying material which will operate within the algorithms to achieve the agreed upon level of security. The negotiation in this step is encrypted using the ISAKMP SA keys (like an IKE SA).

4. The entities apply the chosen type of protection in data exchanges and periodically change the keying material.

Steps 1 through 3 result in a IPSec Security Association (SA), distinct from the ISAKMP SA, between the two entities. These steps are roughly equivalent to the Internet Key Exchange protocol (IKE—Quick Mode, see RFC 2409). IPSec Security Associations are unidirectional. Thus if entity X and entity Y have completed an IKE, then entity X has a security association with entity Y and entity Y has a security association with entity X. These two associations are distinct and each carries a 32-bit number called the Security Parameter Index (SPI) that uniquely identifies the IPSec SA. The SPI is carried with each data packet exchanged between the two entities and allows the receiver to identify the set of previously agreed algorithms and keys.

For example, entity X would place entity Y's SPI in packets destined for entity Y, and vice versa. The recipient typically uses the SPI as an index into a security association database for retrieval of all information related to the SA.

Either according to a time limit, data exchange limit or exhaustion of a sequence number counter, the SA is refreshed with a new set of keying material. If either side wishes to remove an existing SA, they may send a delete notification for the specific SA. In the case when a failure causes an SA to become unreachable, it is particularly advantageous to inform the peer of this failure through a delete notification. This prevents the peer from sending data packets which would need to be discarded because of the lack of an ingress SA. This conserves processing resources at each peer.

A problem with Mobile IP (MIP) and IPsec in seamless roaming is that configuration data such as IPsec authorization key and the Mobile IP session key and policy attributes need to be in place a priori. Mobile IP presupposes a secret key, namely the authentication key (also known as a session key) shared between the MN and the PGN, as well as other configuration data. Likewise, IPsec presupposes a method by which the MN can be authenticated (shared key, X.509 certificate, etc.). Provisioning and managing this data in a non-automated fashion presents a very large administrative burden on an operator wishing to deploy this technology. While X.509 public key certificates provide one avenue for portable authentication credentials, their use would require provisioning each MN with a signed certificate as well as a reliable, worldwide public key infrastructure. Such an infrastructure is not presently in existence.

The invention also solves the problem of automating the configuration of the MN to make use of the seamless roaming technology. A shared secret MIP session key (required to be 128 bits) must be used to authenticate all Mobile IP messages, including registration messages. The Mobile IP Specification assumes such a shared key exists but offers no guidance on its distribution. Typically, the shared key is 'pre-programmed' manually. This entails programming the key for each MN to be used or provisioning each MN with a public key certificate. This does not scale to large numbers of MNs very well.

In order for MIP client registration to occur as well as IPsec ESP tunneling, a MIP session key and IPsec keying material along with configuration data are required. These keys must be exchanged securely and in a manner that imposes little overhead on the mobile client or the operator provisioning such a service.

Since IPsec key exchange and Mobile IP registration require a priori authentication, the invention uses the network-based authentication mechanism inherent in the GPRS/UMTS network as a trusted means for authenticating a MN. When the MN wishes to establish a session to the PGN for the purposes of transiting data across the Internet, it must first be authenticated by the GPRS network. This authentication occurs prior to any control or data traffic arriving at the PGN. When control or data traffic arrives at the PGN, the PGN is assured that the MN is permitted to use its services. Recall that the IPsec authentication key and the Mobile IP session key are required to be shared secrets between the MN. To effect automatic configuration these would need to be sent unencrypted from the PGN. Sending such values in an unencrypted manner exposes the system to innumerable security vulnerabilities. Since a shared secret between the MN and PGN does not exist, IPsec cannot be used as there is no means of authentication. At present there is no standard mechanism for exchanging shared secrets extant with the GPRS/UMTS or the MIP standards.

Because the MN has been authenticated by the GPRS/UMTS network, the invention provides a means for receiving a MN's public key (generated by the MN), and sending the PGN's public key to the MN. This public key exchange occurs only once. The public keys form the basis by which the PGN and MN can mutually authenticate one another (e.g. a challenge-response protocol) and set up an encrypted session through which shared secrets and other configuration data can be sent or updated.

The particular protocol this invention uses for public key exchange and encrypting channels is the Secure Shell (SSH) protocol now being standardized by the Internet Engineering Task Force (IETF). The protocol is described collectively in the IETF draft Request for Comment documents: draft-ietf-secsh-architecture-12.txt, draft-ietf-secsh-connect-15.txt , draft-ietf-secsh-transport-14.txt,draft-ietf-secsh-userauth-15.txt. SSH is a protocol that provides mutual authentication using (among other methods) public keys, transport layer security and various functions including securing file transfers, copying, moving or deleting files securely. The system, as embodied in both commercial implementations and open source implementations, provides the encryption algorithms: 3DES (Triple Data Encryption Standard), Twofish, Blowfish, Arcfour, CAST128 (Block cipher), AES (Advanced Encryption Standard) and the secure hash algorithms: MD5 (Message Digest Algorithm 5) and SHAI (Secure Hash Algorithm 1) as well as public key operations: Diffie-Hellman and DSA (Digital Signature Algorithm), PGP(Pretty Good Privacy) key support. The system provides multiple channel support with public key authentication support and client and server authentication, X11 connection forwarding, TCP/IP (Transmission Control Protocol/Internet Protocol) port forwarding, TCP (Transmission Control Protocol) wrapper support, automatic public key upload to server as well as other features.

The invention uses the Secure Shell Protocol to effect automatic configuration for both Mobile IP and IPsec following the basic steps:

A one time SSH configuration is provided where the MN and the PGN exchange public keys over a network such as the GPRS network. Using the GPRS network advantageously authenticates the MN for using its services.

The MN then establishes an authenticated, encrypted session with the PGN, authenticated through the exchanged public keys, and effects a transfer of user specific configuration data. Configuration includes, but is not limited to, the IPsec authentication key and the Mobile IP session key.

MIP sessions across non-GPRS networks (e.g., IEEE 802.11, etc.) are tunneled using IPsec ESP. An Internet Key Exchange (IKE) is used to create and update the IPsec Security Association (SA) when it expires. This is part of the IPsec standard. The previously configured IPsec authentication key is used with IKE to strongly authenticate the MN.

If the MN requires a new Mobile IP session key a mechanism is provided for refreshing this data. The mechanism makes use of standard Mobile IP messaging. Although the MIP standards do not impose a lifetime on the MIP session key, the invention allows changing of the MIP session key according to a configured lifetime (typically time duration or volume of traffic expressed in bytes exchanged). This affords greater security for Mobile IP.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 8B is a second part of a diagram showing of FIG. 8A;

FIG. 9A is a User Datagram Protocol (UDP) datagram showing payload attributes of a datagram; and FIG. 9B is a User Datagram Protocol (UDP) datagram showing payload attributes of a datagram.

DESCRIPTION OF THE PREFERRED EMBODIMENTS

Figure 1:
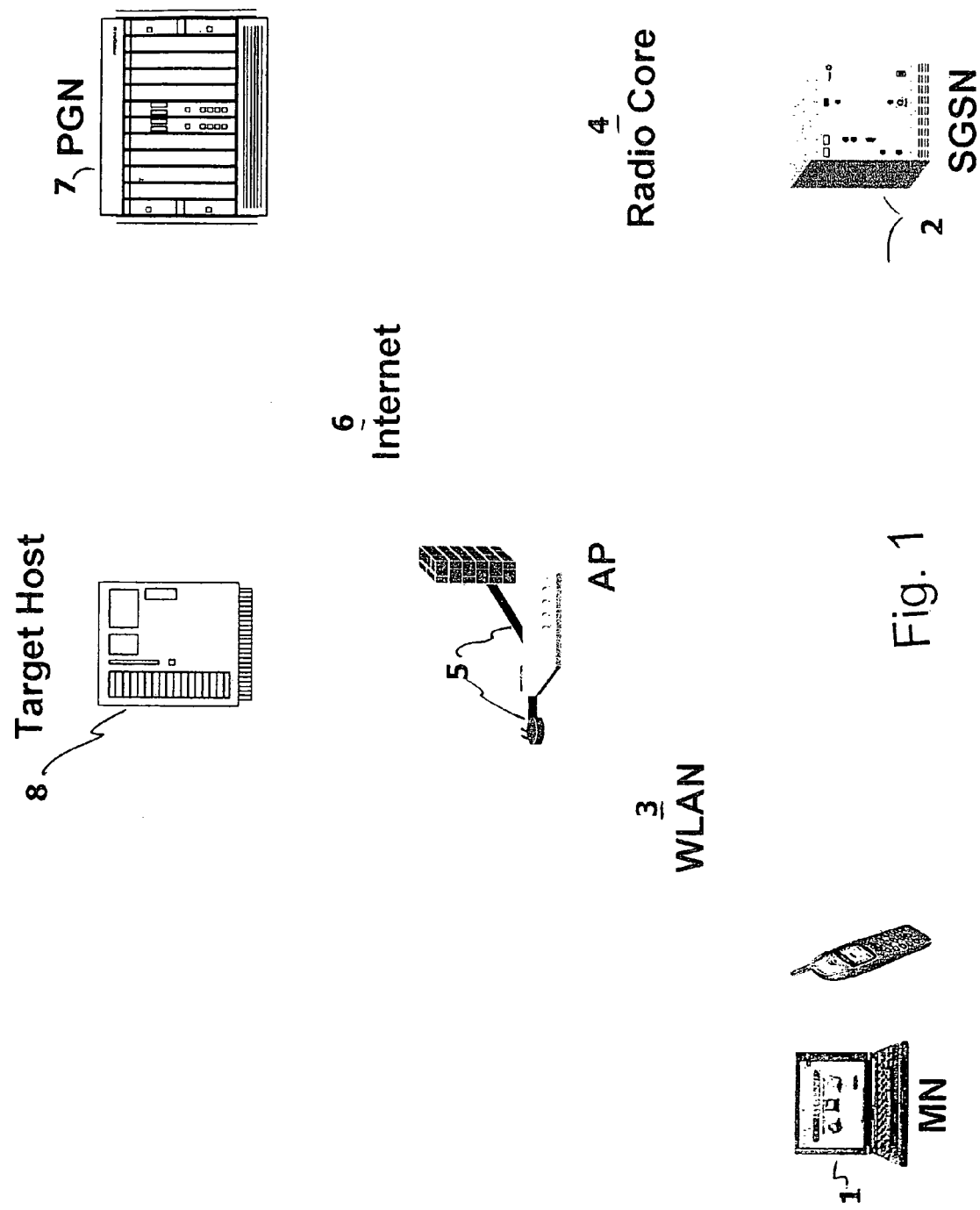
FIG. 1 is a schematic diagram showing the network infrastructure system according to the invention.

Referring to the drawings in particular, the invention operates within a network infrastructure shown in FIG. 1. A mobile node (MN) 1 is provided in the form of a laptop computer, a PDA or other mobile device. The MN 1 includes a radio frequency transceiver. This can be used with a WLAN 3. The WLAN 3 includes normal LAN components such as a server connected to nodes via wires such as twisted pair wires and operating using Ethernet (carrier sense multiple access/collision detection CSMA/CD or IEEE 802.3). With a WLAN at least some of the nodes are formed of an MN 1 with an access point (AP) 5. The AP 5 includes a radio transceiver connected by wires (such as twisted pair wires) to a hub, switch or router of the LAN and connected from this hub to the server. The wireless connection between AP 5 and MN 1 uses the IEEE 802.11 standard (other public standards or proprietary wireless node or hot spot systems and standards may be used instead).

The MN 1 may also be used with a radio access network (RAN) generally designated 10. The RAN 10 includes a radio core 4 which includes the physical lines (or network) running from a serving GPRS support node (SGSN) 2 to the gateway GPRS support node, provided here as a packet gateway node (PGN) 7. The PGN 7 handles data traffic to and from mobile subscribers via RAN 10. Data traffic arriving from, or destined to users on the RAN 10 must use one or more data communications protocols specific to mobile users and the RAN technology. Traffic arriving from, or destined for the IP Router Network (e.g. the Internet) 6 can use a variety of IP-based protocols, sometimes in combination. The architecture of the PGN is able to provide protocol services to the RAN 10 and to the IP Network 6, scale to large numbers of users without significant degradation in performance and provide a highly reliable system. The PGN 7 also provides for management of mobile subscribers (e.g., usage restrictions, policy enforcement) as well as tracking usage for purposes of billing and/or accounting. The PGN 7 may be provided in various forms and preferably is provided as disclosed in published U.S. patent application Ser. No. 20020181476 and 20020184487 (the content of published U.S. patent application Ser. No. 20020151476 and 20020184487 are hereby incorporated by reference). The PGN 7 can function as both a Mobile IP home agent (HA) as well as a GGSN.

The SGSN 2 is connected to one or more cellular towers (radio frequency towers) via a Mobile Switching Center for radio communications for a particular cellular area. The radio core 4 provides the physical connection to the PGN 7. This allows users of the radio core 4 to access content from the Internet 6, such as through a host 8.

The invention uses the infrastructure shown in FIG. 1 to provide a secure communications system and method including secure communications through the WLAN 3. Further, the invention allows for roaming capabilities such that the MN 1 is provided with secure access possibilities both through the WLAN 3 and through the RAN 4.

Ultimately, the MN 1 wishes to access content at some target host 8 residing on, or accessible through the Internet 6 using the wireless technology of the WLAN 3. There are two networks through which the MN 1 can pass in order to reach the target host 8. The MN 1 may access the WLAN 3 using 802.11 technology (or some other wireless node technology) and through the AP 5, traverse the Internet 6 to reach the target host 8. However, as noted earlier, this connection is not secure. Alternatively, the MN 1 may access the target host 8 by establishing a connection across an airlink to the SGSN 2 through the RAN 4 to the PGN 7. Once this link is established, the MN 1 can reach the Target Host through the Internet 6. Collectively, the airlink, SGSN 2, Radio Core or RAN 4 and PGN 7 constitute elements of a GPRS/UMTS network 12. Data flowing across the airlink is secured with encryption. The link from the SGSN 2 through the Radio Core 4 into the PGN 7 traverses a private network and this provides some measure of security.

The MN 1 desires the ability to roam between the GPRS/UMTS network 12 to access the target host 8 and the WLAN 3 to access the target host 8 in a secure manner. To manage this mobility, this invention makes use of Mobile IP for managing mobility and IPsec for managing security. A complete description of Mobile IP can be found in "Mobile IP", James D. Solomon, Prentice Hall, 1998. The full specification for IPsec can be found in "The Big Book of IPsec RFCs".

For an MN 1 to use Mobile IP and securely roam onto an 802.11 WLAN 3, it must establish a shared secret key to be used for both securing the data session and satisfying the authentication requirements of Mobile IP. However, one of the difficulties in implementing Mobile IP is that it was necessary to manually pre-program the 128-bit Mobile IP session key. In addition, to provide confidentiality of the data content, an additional layer of protection, such as IPsec, is required. For implementing this with many users, the time to pre-program can be extensive.

Figure 2:
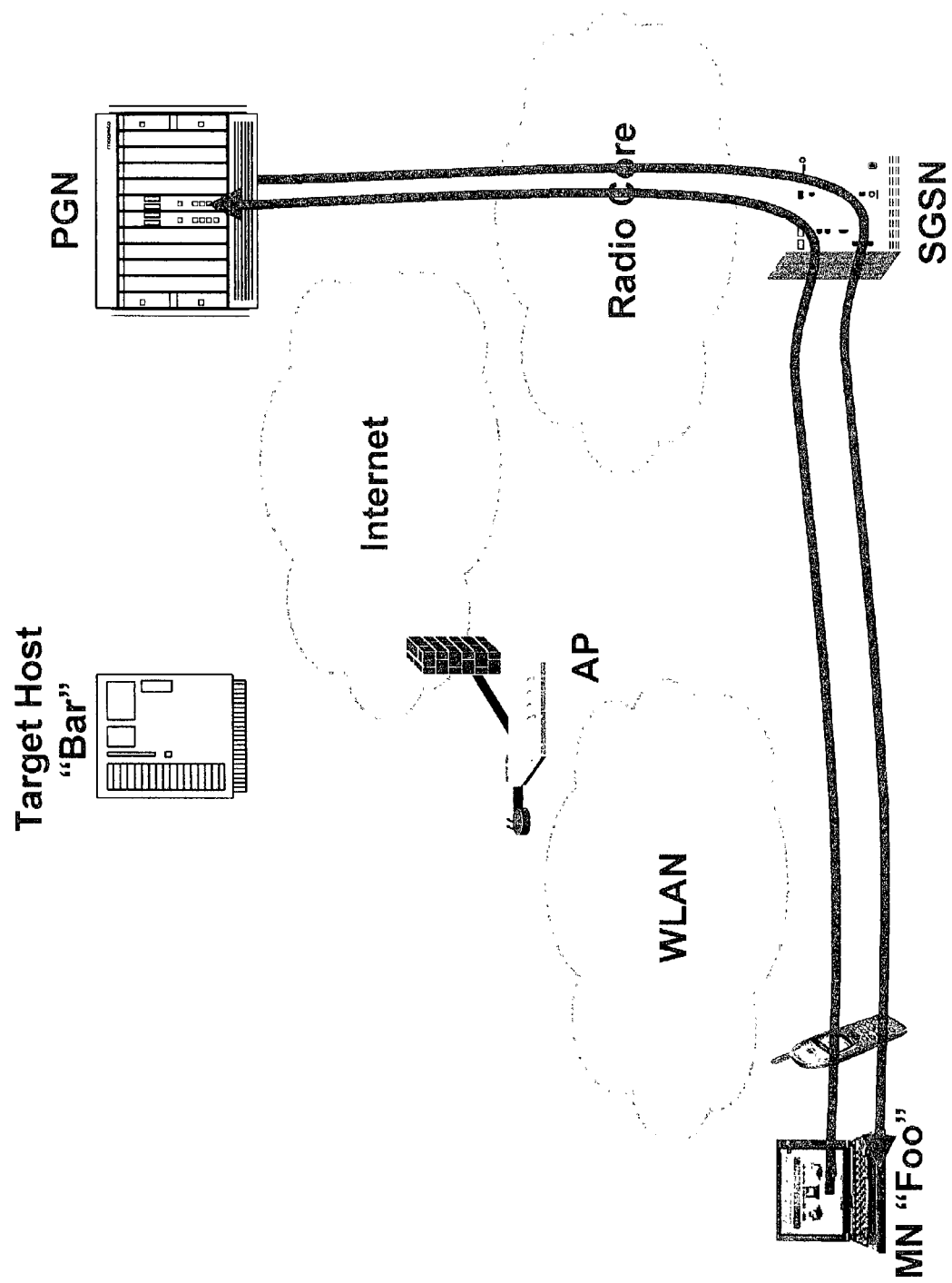
FIG. 2 is a schematic diagram showing a first phase of the process according to the invention.

The invention allows users to roam from GPRS to WLAN using the PGN 7 as the home agent with the connection via WLAN 3 providing the care of address. As shown in FIG. 2, the MN 1 is provided with the address of the PGN 7 and requests configuration data (including an IPsec authentication key and a Mobile IP session key) from the PGN 7 using Secure Shell. The PGN 7 and the MN 1 exchange keying and configuration data secured using exchanged keys. Keys may be exchanged using either authenticated key exchange protocols or unauthenticated key exchange protocols. Since the MN 1 is authenticated via the mechanisms of GPRS, an unauthenticated key exchange suffices. Examples of such key exchange protocols are Diffie-Hellman, the MVQ protocol or its one-pass variant (without certificates), or the Key Exchange Algorithm can be used to establish the shared key (cf., Wilson and Menezes, "Authenticated Diffie-Hellman Key Agreement Protocols", Proc. Selected Areas in Cryptography, Lecture Notes in Computer Science, 1556, (1999), 339-361.)

The preferred embodiment makes use of the Secure Shell Protocol as implemented, for instance, in the Secure Shell, Inc. commercial product as follows:

A minimal configuration file for the Secure Shell protocol is provided at the MN 1. This configuration file is used by the command line ssh applications, scripts or executable programs. In a Windows Operating System environment this file must be named ssh2_config and must reside in the directory C:\Documents and Settings\<username>\Application Data\SSH. An example of a minimal SSH configuration file is as follows:

```
SSH CONFIGURATION FILE FORMAT VERSION 1.1
REGEX-SYNTAX egrep
end of metaconfig
(leave above lines intact!)
ssh2_config
SSH 3.0 Client Configuration File

The ".*" is used for all hosts, but you can use other hosts as
well.
.*:
General
    VerboseMode         no
    ForcePTTYAllocation no
    PasswordPrompt      "%U's password:"
Network
    Port                22
    KeepAlive           yes
Crypto
    Ciphers             blowfish
    MACs                AnyMAC
User public key authentication
    IdentityFile        identification
    AuthorizationFile   authfile
Authentication
    AllowedAuthentications publickey
```

A client application handling the overall configuration of Mobile IP, IPsec and SSH at the MN 1 insures that the configuration file is consistent with the configuration shown above.

The system of the invention can then provide for a public key exchange. To do this the MN 1 generates a public/private key pair (RSA/DSA) and stores it locally in the prescribed SSH protocol format. When the MN is not configured for seamless roaming, and having generated a public/private key pair, the MN establishes a GTP (GPRS Tunneling Protocol (3GPP)) session (across the GRPS network) at a configured Access Point Name (APN) (this resolves to an IP address) used exclusively for public key exchange. Alternatively, the MN may use other standard protocols such as the Service Location Protocol (see RFC 2165) to discover the address needed for obtaining configuration data.

Assuming the he client application has the network address needed for obtaining configuration data, it constructs and sends a User Datagram Protocol (UDP) datagram with a source address equal to the PGN-ID (equivalent to a router-ID) for a configured UDP port. An example payload of the datagram is shown in FIG. 9A where:

| | |
|---|---|
| Type | 1 indicating a configuration request from the client; |
| Timestamp | 32-bit value of milliseconds since midnight UT.; |
| Fname Len | Length (in bytes) of filename of the public key file; |
| Fname | The name of the public key file (in ASCII); |
| Key File Len | The length (in bytes) of the public key file; |
| Contents | The content of the public key file. |

In response, the MN receives the a UDP datagram at a configured UDP port as shown in FIG. 9B where:

| | |
|---|---|
| Type | 2 indicating a configuration response from the PGN; |
| Timestamp | 32-bit value of milliseconds since midnight UT. |
| Fname Len | Length (in bytes) of filename of the PGNs public key file; |
| Fname | The name of the PGNs public key file (in ASCII); |
| Key Fil Len | The length (in bytes) of the public key file; |
| Contents | The content of the public key file. |

The client application at MN 1 insures that the timestamp is strictly increasing and within a predefined tolerance; otherwise the client silently drops the datagram. Otherwise, the MN 1 application inspects the name of the public key file and verifies that it conforms to the following format:

key_<port>_<IP Address>.pub

In this format <port> will indicate the TCP port used for all subsequent SSH transactions. The value <IP Address> is the dotted decimal IP address to be used for subsequent SSH transactions. An example of a public key file named key_22__192.168.20.229.pub is shown below.
BEGIN SSH2 PUBLIC KEY
Subject: cskiscim
Comment: "host key for 192.168.20.229, accepted by cskiscim Tue May 14 2002 19:36:36"
AAAAB3NzaC1kc3MAAACBAKPruNBf5YFX7kVBIA
    bnsAA5TnVrYSvQBZJ7/upKtnbP2US1aE rxxhrZamxhc
    OGoonfXDmVtV0hDT80ouLaNkWn35aJt4FkprKcxWf
    DBzcRdVnASt8E54ItyQpd01ZdYNPXEb7FKDZQk
    ITrJFTzMibkM99fY3ZjAxo6G5QPGpGLzAAAAFQD
    RseSNAr8r/D zsB7DCDtHN874T9QAAAIARCYRTqm
    MEg8i1Th6hcf6yAq3RQg/yG1f3LPqQTM0Zz385ErEB
    NNnbv8/8dF8CiZGnSB0J+udeADf7uEr+R+JhgOvEo
    ZE/WmpDSpngCVeOEccbNltY57soIe0Vjo/F/bOZre
    235v7EyUAaW0Am241LzbE4Et7w91+w+qKrUJ1d
    NgAAAIAsE6A9SIihYCO7VGX5T/IDiJLgFg/qDwj/+
    ARJx48+eSg5fQWmo/RW0+kaNZT6tjv1QuEeX/Cj+
    YMgIHOP2+Ttx88CR2gL3PD5IrUq2ssudD1/z7gvX5
    TJR187T+feIzhGiW8EGWtbexvyUtPZfgETSUWf
    twp4JX01WRLGGZqBoQ==
END SSH2 PUBLIC KEY
The file name communicates the fact that SSH transactions are sent to the IP address 192.168.20.229 at port 22.

The client application at the MN 1 will store this IP address and TCP port for subsequent SSH transactions. The client application modifies its SSH configuration file to reflect the port value communicated as part of the public key file name.

The contents of the key file is stored in a file with the Fname as the file name. In the Windows Operating System, this will be in the directory C:\Documents and Settings\<username\>Application Data\SSH\HostKeys After these steps, the MN 1 is in possession of the PGN's public key and the PGN 7 is in possession of the MN's public key. The MN and PGN 7 can now mutually authenticate each other using the SSH protocol or for example, a challenge-response protocol. This forms the basis by which the MN 1 can establish an encrypted session with the PGN and securely receive the requisite configuration data as follows:

The MN 1 retrieves its configuration file from the PGN 7 by issuing the following secure copy command via a script file or incorporated within a program:

scp2-q-P<port>-cblowfishum@<ip-address>:/um/<username>.cnf/umdir/<username>.cnf

This command, embedded in a script or called from a program, establishes an encrypted session between the PGN 7 and the MN 1 (authenticated with the exchanged public keys) and securely copies the file <username>.cnf from the PGN to the directory (/umdir/) with the same file name using the Blowfish cipher. Other ciphers are available.

The content of the configuration file is, minimally:

| | |
|---|---|
| Configuration Version | 16 bits |
| Mobile IP Version | 8 bits |
| Mobile IP Home Address | Dotted decimal representation |
| Mobile IP SPI | 32 bits |
| MIP Session Key | 128 bits |
| MIP Key Lifetime (seconds) | 32 bits |
| MIP Key Authentication Method | see |
| Network Access Identifier Length | 8 bits |
| Network Access Identifier | variable (see RFC2486) |
| IPsec authorization key | 1024 bits |
| IPsec Gateway Address | Dotted decimal representation |

Each attribute—value pair occupies a single section of the file. A single blank line separates sections of the file. The file is Base64 encoded. Other formats, such as XML are possible.

The MN 1 decodes each value and verifies the lengths of each entry in the configuration file to insure compliance with the above specifications.

The MN then extracts the required configuration values for Mobile IP and IPsec use.

Figure 3:
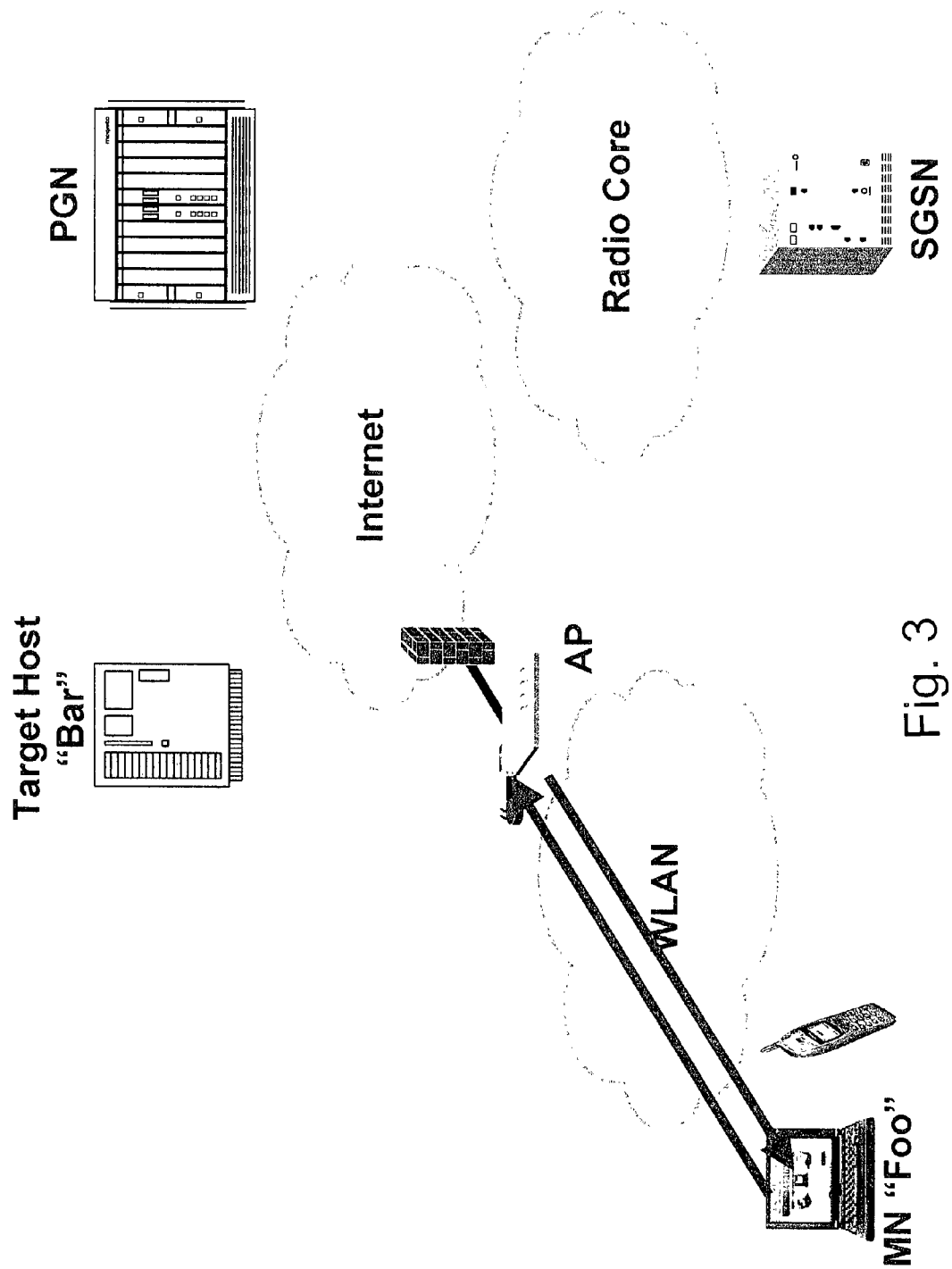
FIG. 3 is a schematic diagram showing a second phase of the process according to the invention.

With this data in place and having roamed onto the WLAN 3, as shown in FIG. 3, the MN 1 connects through the WLAN 3 and requests a local care-of address (COA) from a DHCP server on the Internet. This COA is used for the Mobile IP protocol. The DHCP server then sends a COA across the Internet and across the WLAN 3.

Figure 4:
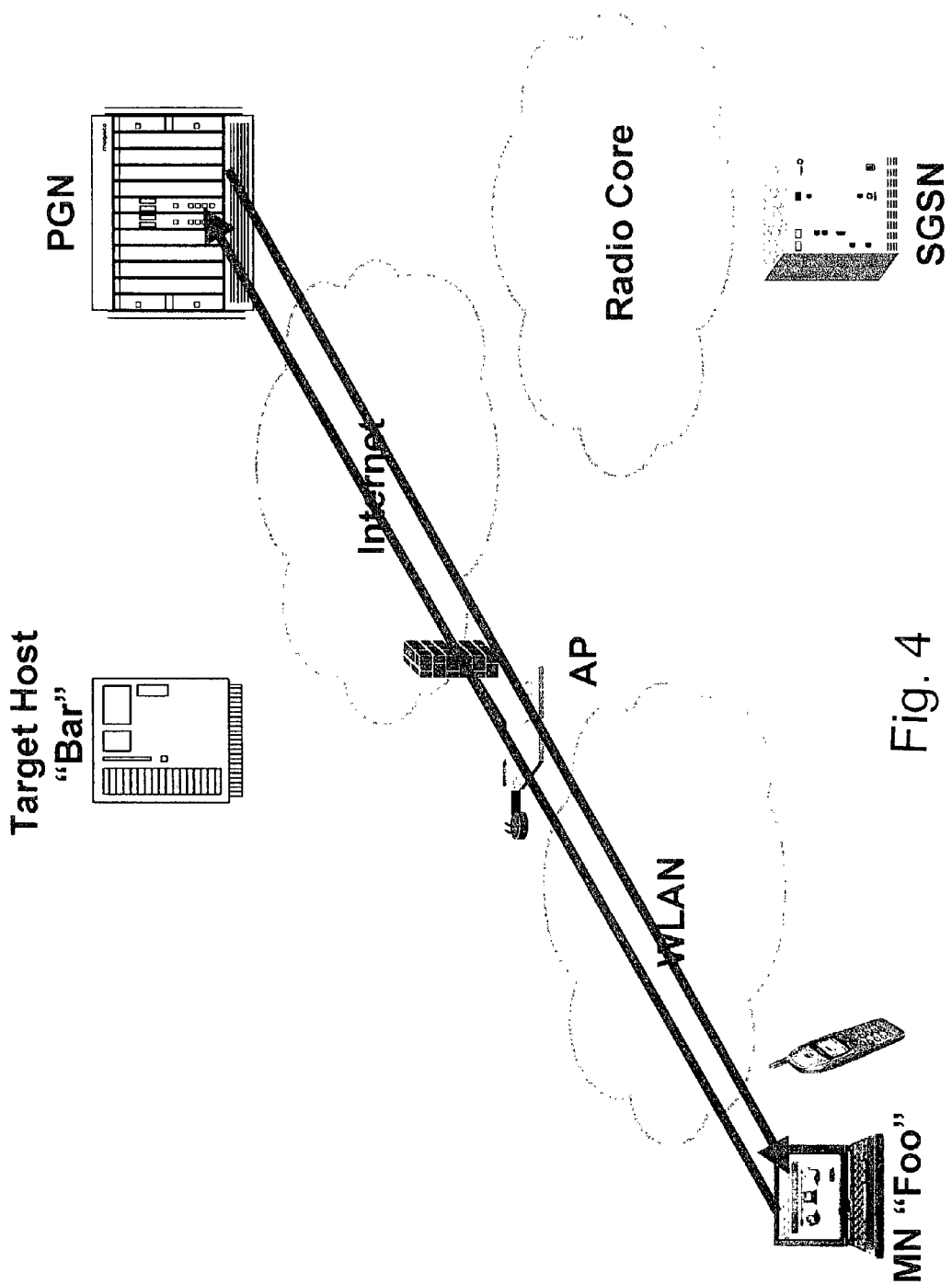
FIG. 4 is a schematic diagram showing a third phase of the process according to the invention.

As shown in FIG. 4, the MN 1 sends a Mobile IP registration request, authenticated with the configured Mobile IP session key, to the HA which is hosted in PGN 7. The HA validates and authenticates the message then sends a registration reply authenticated with the same configured session key. According to the preferred embodiment IKE is used to set up an IPsec tunnel established between the PGN 7 and the MN1 using the COA to securely transit traffic across the WLAN 3. The secure transmissions has authentication, encryption and message integrity, indicated by a Message Integrity Code (MIC).

Figure 5:
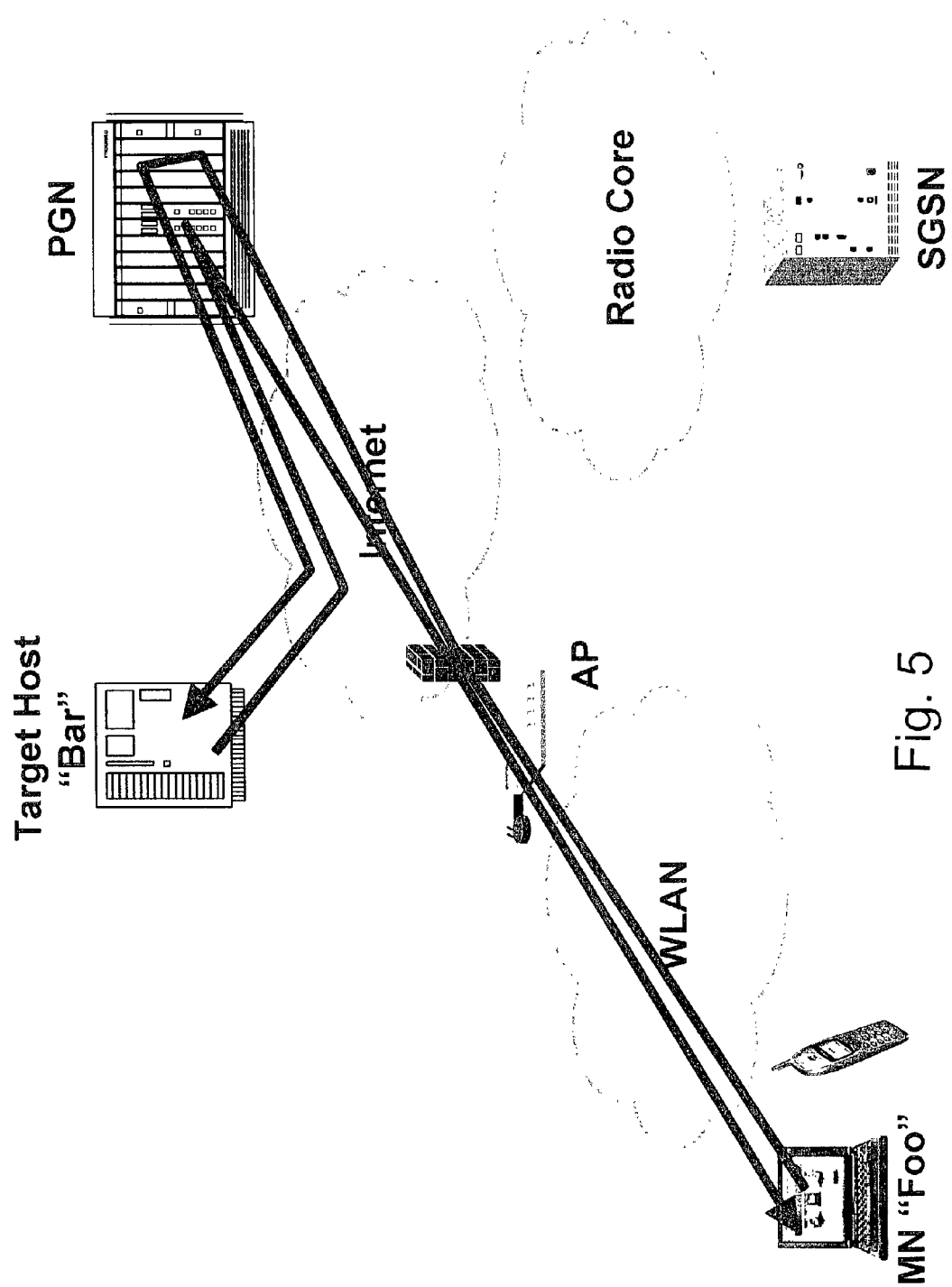
FIG. 5 is a schematic diagram showing a fourth phase of the process according to the invention.

FIG. 5 shows the state of the process and system according to the invention wherein the MN 1 sends packets to the target host 8 via the HA hosted by PGN 7, and also by the Internet 6 and the WLAN 3 with a access point. The entire data exchange across the WLAN is secured by IPsec. Similarly, target host 8 sends packets to MN 1 via the HA hosted on PGN 7, via the Internet and via WLAN 3.

Figure 6:
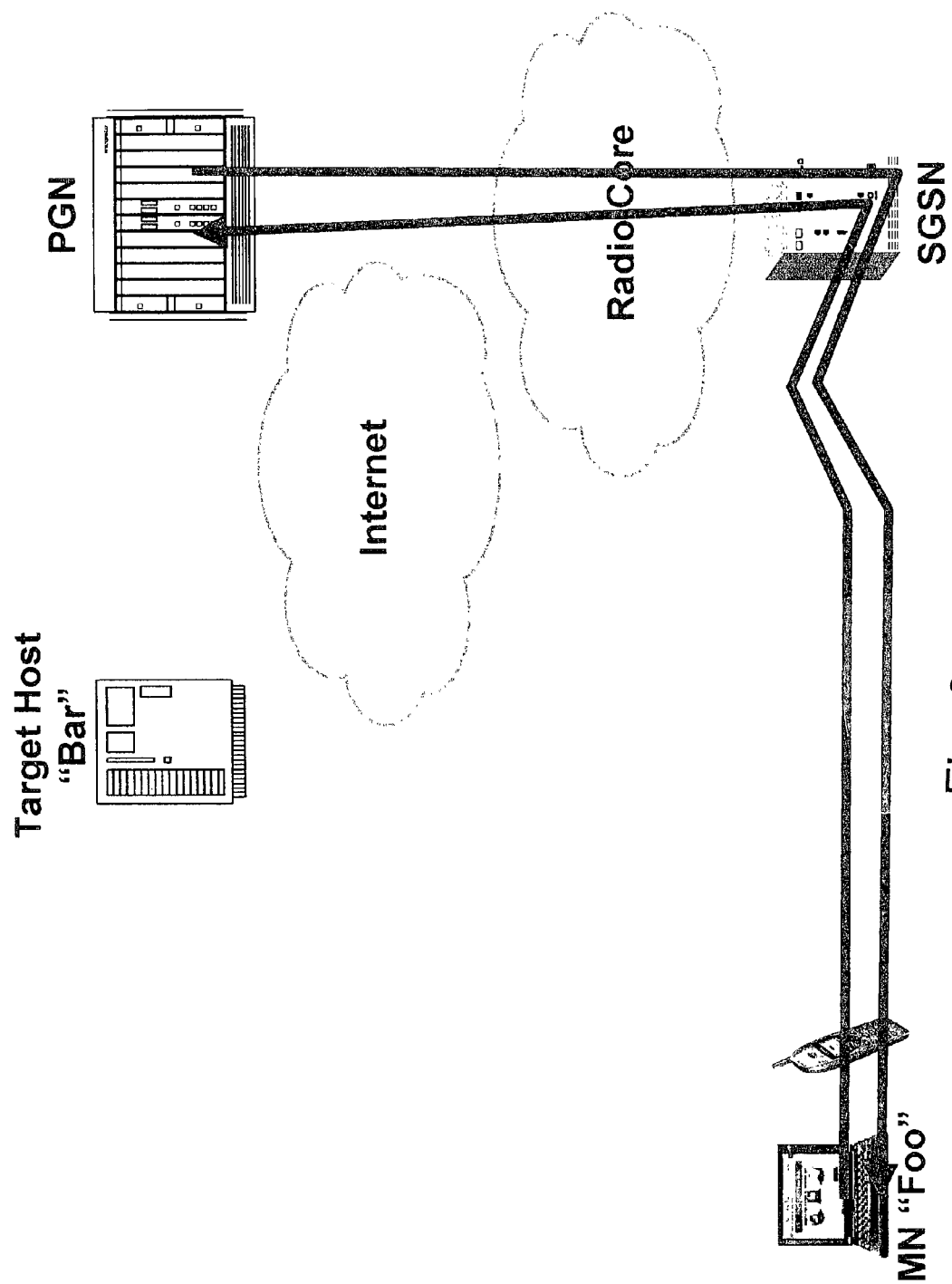
FIG. 6 is a schematic diagram showing a fifth phase of the process according to the invention.

FIG. 6 shows the subsequent state wherein the MN 1 can roam from the WLAN 3 to the GPRS. The MN 1 sends a Mobile IP registration request to the HA authenticated using the configured Mobile IP session key. According to the method of the invention the COA is used while connected to the WLAN 3. Subsequently, the MN 1 leaves the WLAN3 and indicates via a registration request that MN 1 is back home on the GPRS/UMTS network. The HA then sends a Mobile IP registration reply back to the MN 1 confirming its arrival to the home network.

Figure 7:
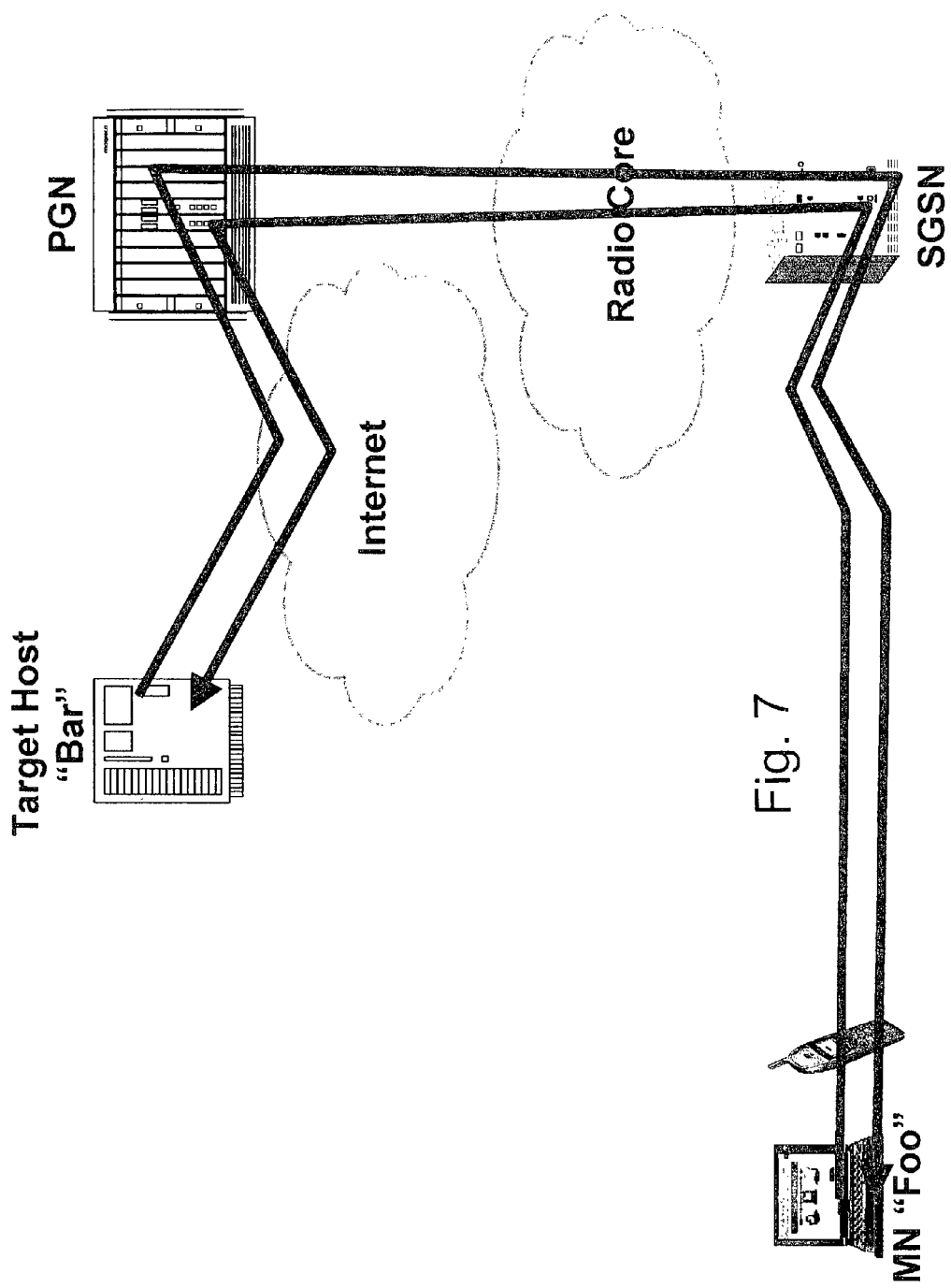
FIG. 7 is a schematic diagram showing a sixth phase of the process according to the invention.

FIG. 7 shows further data transfer using the GPRS. Packets from the MN 1 to the target host 8 go via the GPRS only. Packets from the target host 8 now go to the MN 1 via the GPRS only. However, the MN1 can roam including again connecting to the WLAN 3.

Figure 8A:
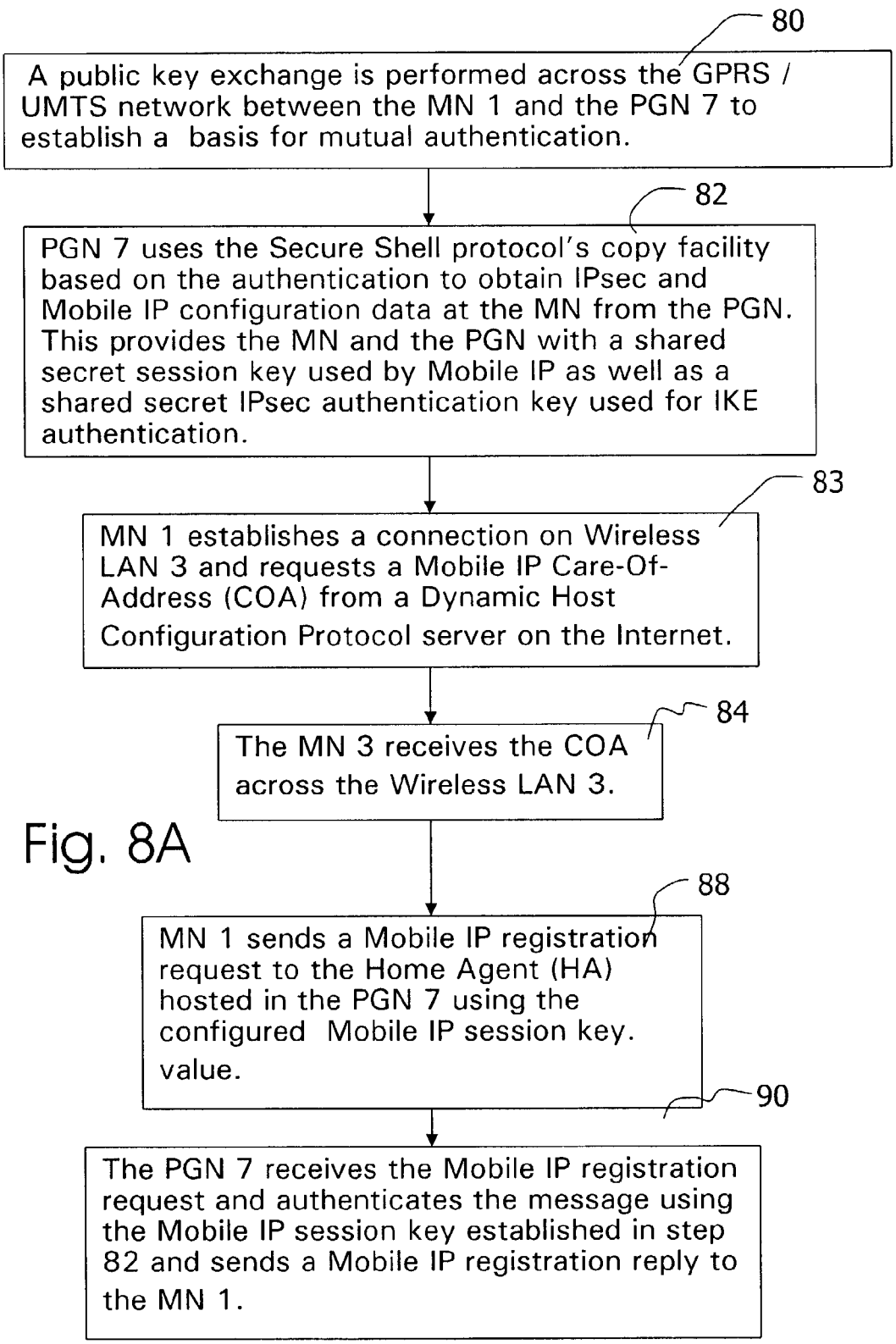
FIG. 8A is a first part of a diagram showing an example of the process according to the invention.

FIGS. 8A and 8B show a preferred method according to the invention. This preferred method is as follows:

As indicated at 80, The MN 1 performs a public key exchange across the GPRS/UMTS network with the PGN 7 to establish the authentication values used by the Secure Shell protocol. In Step 82, the MN 1 uses the secure copy facility of Secure Shell to obtain IPsec and Mobile IP configuration data. The secure copy is authenticated using the public keys exchanged in Step 80. At this point, the MN 1 and PGN 7 are in possession of a shared secret session key used by Mobile IP as well as a shared secret IPsec authentication key used for IKE authentication.

The MN 1 establishes a connection on Wireless LAN 3 at step 83 and requests a Mobile IP Care-Of-Address (COA) from a Dynamic Host Configuration Protocol (DHCP) server on the Internet or a local server. The DHCP is based on device addresses and is used to allocate IP addresses and other configuration information automatically for networked systems.

At step 84 the MN 3 receives the COA across the Wireless LAN 3. At step 88 the MN 1 sends a Mobile IP registration request to the Home Agent (HA) hosted in the PGN 7 informing it that it is on a visited (foreign) network. The PGN 7 receives the Mobile IP registration request at step 90 and authenticates the message using the 128-bit key established in step 82 and sends a Mobile IP registration reply to the MN 1. The MN 1 then negotiates an IPsec ESP at step 91 using the IPsec authentication key established in step 82. The MN 1 then sends packets to the target host 8 using the ESP encapsulated within the Mobile IP protocol to the PGN 7. The PGN 7 de-encapsulates the Mobile IP protocol and the ESP, and forwards the packets to the target host 8.

The target host 8 replies with packets to the PGN 7 at step 92. The PGN 7 then forwards these packets using the ESP encapsulated within the Mobile IP protocol to the MN 1.

At the conclusion of the data session, the MN 1 terminates the connection with the PGN 7 and detaches from the WLAN at step 94.

At step 96, when the MN 1 roams back into the GPRS/UMTS network, the MN 1 sends a Mobile IP registration request to the Home Agent hosted in the PGN 7 indicating that it is back on the home network.

At step 97, the PGN 7 sends a Mobile IP registration reply to the MN 1 using the 128-bit session key obtained in Step 82 within the reply message.

The system and method of the invention provides several advantages for wireless secure communications, including the ability to securely roam between, for example, a WLAN and a GPRS/UMTS connection with no manual pre-programming of a Mobile IP authentication key or an IPsec authentication key. The system and method provide a solution to the security problem inherent in wireless LANs or other networks deemed insecure using purely standards based mechanisms. The system and method are particularly advantageous using the described PGN 7 based on its function as both a Mobile IP home agent as well as a GGSN.

The system and method of the invention provide conveniences, particularly as to obtaining the 128-bit Mobile IP session key and the IPsec authentication key without the burdensome step of manual pre-programming. In the solution of the invention, user authentication is handled by the GPRS/UMTS network before the PGN ever sees the traffic. Therefore, the system allows one to perform a public key exchange using any method to establish a large key and use this to authenticate a secure session for configuring an IPsec shared secret authentication key and a Mobile IP session key as well as other configuration data. Manual provisioning of the authentication values is therefore not required. The entire process can be automated with a script or a program. The configuration need not remain static. As desired, the MN 1 can refresh its configuration data securely using the exchanged public keys.

For example, the following describes how a new Mobile IP session key can be obtained within the present framework.

Prior to the expiration of the Mobile IP session key, the MN 1 signals its desire to refresh its Mobile IP session key by sending a Mobile IP Registration Request with a Vendor Specific Extension (see RFC 3115). The vendor type in this extension indicates that a Mobile IP session key refresh is desired; the vendor value field is empty.

When the PGN 7 receives, validates and authenticates this message, it generates a new Mobile IP session key and encrypts it with the MN's public key. The PGN 7 replies to the MN 1 with a Mobile IP Registration Reply with the vendor type indicating a new Mobile IP session key and the vendor value equal to the new encrypted Mobile IP session key. Note that this registration reply carries an authentication value based on the previous Mobile IP session key.

The MN 1 receives this registration reply, validates and authenticates this message. The MN 1 extracts the encrypted value and decrypts it with its private key. Both the MN 1 and PGN 7 use this value to authenticate subsequent Mobile IP messages. This gives the solution according to the system and method of the invention stronger security.

While specific embodiments of the invention have been shown and described in detail to illustrate the application of the principles of the invention, it will be understood that the invention may be embodied otherwise without departing from such principles.

What is claimed is:

1. A process, comprising:
    providing a mobile node (MN) adapted to communicate with a packet gateway node (PGN) via a first network connection of a first network;
    establishing an encrypted channel between the MN and the PGN based on an authentication mechanism of the first network connection between the MN and the PGN;
    receiving by the MN configuration data from the PGN using the encrypted channel; and
    using by the MN the configuration data for secure communication with the PGN via a second network connection of a second network through at least an access point, the first and second networks being different networks.

2. The process according to claim 1, wherein the first network connection is via a serving General Packet Radio Service (GPRS) support node with a radio network connection to the PGN as a GPRS support packet gateway node.

3. The process according to claim 1, wherein the authentication mechanism includes:
    at the MN generating a public/private key pair and storing the pair;
    sending from the MN a message containing at least the MN's public key to the PGN via the first network connection;
    receiving by the MN a message from the PGN containing at least the PGN's public key;
    storing the PGN's public key at the MN; and
    using the stored public key by the MN for authentication of one or more messages from the PGN.

4. The process according to claim 1, wherein said receiving by the MN configuration data from the PGN using the encrypted channel includes providing Mobile Internet Protocol (MIP) configuration data and the IP Security protocol (IPsec) configuration data.

5. The process according to claim 4, further comprising:
    using the Internet Key Exchange (IKE) protocol with the MN requesting Encapsulated Security Protocol for establishing a security association (SA) with the PGN;
    connecting the MN to a non-GPRS wireless local network;
    establishing a MIP sessions across the non-GPRS network as a tunneled session using a IPsec encapsulating security payload (ESP).

6. The process according to claim 4, wherein said using the configuration data by the MN for secure communication with the PGN includes:
    connecting the MN to the first network connection as a radio network connection to a serving General Packet Radio Service (SGSN) support node with a network connection to the PGN as a gateway GPRS support node (GGSN), and the MN to authenticate the PGN to a non-GPRS wireless local network;
    establishing Mobile IP sessions across the non-GPRS network as a tunneled session using a IPsec encapsulating security payload (ESP).

7. The process according to claim 6, further comprising obtaining a new Mobile IP session key by the MN, including:
    prior to expiration of a Mobile IP session key, the MN sending a Mobile IP registration request with a Vendor Specific Extension indicating that a new Mobile IP session key is desired to the PGN, the PGN receiving, validating and authenticating this request;

receiving by the MN a new Mobile IP session key from the PGN encrypted with the MN's public key; and extracting by the MN the encrypted value of the encrypted new Mobile IP session key and decrypting the encrypted value with the private key of the MN.

8. The process according to claim 7, wherein the obtaining of a new Mobile IP session key includes:

providing the registration reply with an authentication value based on the previous Mobile IP session key.

9. The process according to claim 1, further comprising:

establishing a connection of the MN on a Wireless Local Area Network (WLAN);

requesting a Mobile IP Care-Of-Address (COA) from a dynamic Host configuration protocol server;

receiving the COA at the MN from the dynamic Host configuration protocol server and sending data packets from the MN to a target host via the WLAN connection and receiving data packets from the target host via the WLAN connection.

10. The process according to claim 9, further comprising:

the MN roaming into a region of a radio network and sending a message from the MN as a Mobile IP registration request to a Home Agent hosted in the PGN indicating that the MN is on a home network and using an authentication value within the message;

receiving by the MN a Mobile IP registration reply from the PGN using the authentication value.

11. A wireless data network process, comprising:

providing a serving GPRS support node with a radio network connection to a Gateway GPRS support packet gateway node (PGN);

at a mobile node client (MN) generating a public/private key pair and storing the pair;

sending from the MN a message containing its public key to the PGN via the radio network connection;

responding from the PGN with a message containing the PGN's public key;

receiving the PGN's public key at the MN and storing this PGN public key at the MN;

establishing an encrypted channel between the MN and the PGN based on authentication established using one or more of the exchanged public keys;

performing at the MN a secure copy from the PGN to copy a configuration file from a designated directory on the PGN to a designated directory on the MN;

using a configuration application at the MN to extract Mobile Internet Protocol (MIP) configuration and IP Security protocol (IPsec) configuration data from the configuration file; and using by the MN the MIP and IPsec configuration data for secure communication with the PGN via a second network connection of a second network through at least an access point, the first and second networks being different networks.

12. The process according to claim 11, further comprising using the Internet Key Exchange (IKE) protocol with the MN requesting Encapsulated Security Protocol for establishing the security association (SA).

13. The process according to claim 11, further comprising:

connecting the MN to a non-GPRS wireless local network; and establishing a MIP sessions across the non-GPRS network as a tunneled session using a IPsec encapsulating security payload (ESP).

14. The process according to claim 13, further comprising whenever configuration material is required by an initiate, initiating an SSH session by the MN to the PGN with the PGN replying with fresh keying material to the MN using a secured copy between the MN and PGN and with an Internet Key Exchange (IKE) required whenever the IPsec Security Association (SA) expires.

15. The process according to claim 11, further comprising:

establishing a connection of the MN on a Wireless LAN;

requesting a Mobile IP Care-Of-Address (COA) from Dynamic Host Configuration Protocol (DHCP) server on the Internet; and receiving the COA at the MN from across the Wireless LAN and sending data packets from the MN to a target host via the wireless LAN connection and receiving data packets from the target host via the wireless LAN connection.

16. The process according to claim 15, further comprising:

terminating the connection with the PGN and detaching from the wireless LAN after the conclusion of a data session of the MN.

17. The process according to claim 15, further comprising:

roaming with the MN into a region of the radio network and sending a message from the MN a Mobile IP registration request to the Home Agent hosted in the PGN indicating that the MN is on the home network authenticated using the value obtained; and sending a Mobile IP registration reply from the PGN to the MN using the authentication value obtained.

18. A wireless network system, comprising:

a mobile node (MN) with a wireless transceiver;

a serving General Packet Radio Service (GPRS) support node;

a radio access network;

a GPRS gateway, a packet gateway node (PGN) with an internet connection, the PGN being capable of acting as a Mobile IP home agent (HA);

a wireless local area network (WLAN) with a wireless access node and an internet connection;

at least one or both of a connection from the MN to the PGN and a connection between the MN and the WLAN;

a PGN public key;

a MN generated public/private key pair stored at the MN, the MN public key being sent from the MN to the PGN via the radio network connection and the PGN's public key being sent in reply to the MN via the radio network;

a configuration file at the MN and sent by the PGN using a secure copy format based on the exchanged public keys;

a configuration application at the MN to extract Mobile Internet Protocol (MIP) configuration and IP Security protocol (IPsec) configuration data from the configuration file; and an IPSec Security Association between the MN and the PGN with a security parameters index obtained from the SA for identifying the MN, the IPSec Security association being established between the PGN and the MN using the IP Security protocol (IPsec) configuration data;

wherein the MN is adapted to use the MIP and IPsec configuration data for secure communication with the PGN via a second network connection of a second network through at least an access point, the first and second networks being different networks.

19. A process, comprising:
providing a packet gateway node (PGN) adapted to communicate with a mobile node (MN) via first network connection of a first network;
establishing an encrypted channel between the PGN and the MN based on an authentication mechanism of the first network connection between the PGN and the MN; and
sending by the PGN to the MN configuration data using the encrypted channel, the configuration data for secure communication between the MN and the PGN via second network connection of a second network through at least an access point, the first and second networks being different networks.

20. The process of claim 19, further comprising communication by the PGN with the MN based at least in part on the configuration data sent to the MN.

21. The process of claim 19, wherein the first network connection is via a serving General Packet Radio Service (GPRS) support node with a radio network connection to the PGN as a GPRS support packet gateway node.

22. The process of claim 19, wherein the authentication mechanism includes:
receiving by the PGN from the MN a message containing at least the MN's public key via the first network connection;
sending by the PGN to the MN a message containing at least the PGN's public key; and
the PGN using the public key received from the MN for authentication of one or more messages from the MN.

23. The process of claim 19, wherein said sending by the PGN to the MN configuration data using the encrypted channel includes providing Mobile Internet Protocol (MIP) configuration data and the IP Security protocol (IPsec) configuration data.

24. A mobile node (MN), comprising:
a transceiver adapted to transmit and receive signals to and from a packet gateway node (PGN) via a first network connection of a first network;
storage coupled to the transceiver and adapted to store at least data to facilitate establishment of an encrypted channel between the MN and the PGN; and
wherein the MN is adapted to cooperate with the PGN to establish the encrypted channel between the PGN and the MN based on an authentication mechanism of the first network connection between the MN and the PGN, the MN further adapted to receive configuration data from the PGN using the encrypted channel, the configuration data including at least information that facilitates the MN to securely communicate with the PGN via a second network connection of a second network through at least an access point, the first and second networks being different networks.

25. The mobile node (MN) of claim 24, wherein said MN is adapted to receive a message containing at least the PGN's public key via the first network connection to facilitate the establishment of the encrypted channel.

26. The mobile node (MN) of claim 24, wherein said MN is adapted to use the public key to facilitate the establishment of the encrypted channel.

27. The mobile node (MN) of claim 24, wherein said MN is adapted to generate a public/private key pair, the MN is further adapted to send a message containing at least the generated public key to the PGN via the first network connection as part of the authentication mechanism.

28. The mobile node (MN) of claim 27, wherein said MN adapted to receive PGN's public key, the exchanged public keys to be used for mutual authentication of the MN and the PGN to facilitate the establishment of the encrypted channel.

29. The mobile node (MN) of claim 24, wherein said MN is adapted to receive from the PGN via the encrypted channel Mobile Internet Protocol (MIP) and IP Security Protocol (IPsec) configuration data.

30. The mobile node (MN) of claim 24, wherein said first network connection is via a serving General Packet Radio Service (GPRS) support node with a radio network connection to the PGN as a GPRS support packet gateway node.

31. The mobile node (MN) of claim 30, wherein said MN adapted to securely communicate with the PGN via a second network connection of a wireless local area network (WLAN) based at least on the configuration data.

32. The mobile node (MN) of claim 24, wherein said MN is adapted to couple with a wireless local area network (WLAN) that is coupled to the PGN, to communicate with an IP based network via the WLAN and via the PGN based at least in part on the configuration data provided by the PGN to the MN.

* * * * *